(12) United States Patent
Ishida et al.

(10) Patent No.: US 9,617,715 B2
(45) Date of Patent: Apr. 11, 2017

(54) CONSTRUCTION MACHINE

(71) Applicant: Hitachi Construction Machinery Co., Ltd., Tokyo (JP)

(72) Inventors: Seiji Ishida, Tokyo (JP); Hidetoshi Satake, Ishioka (JP); Yusuke Kajita, Ushiku (JP); Shiro Yamaoka, Tokyo (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 15/015,453

(22) Filed: Feb. 4, 2016

(65) Prior Publication Data
US 2016/0153176 A1  Jun. 2, 2016

Related U.S. Application Data

(63) Continuation of application No. 14/239,795, filed as application No. PCT/JP2012/070557 on Aug. 10, 2012, now abandoned.

(30) Foreign Application Priority Data

Aug. 31, 2011  (JP) .................................. 2011189555

(51) Int. Cl.
*B60W 10/06* (2006.01)
*B60K 6/485* (2007.10)
(Continued)

(52) U.S. Cl.
CPC ............ *E02F 9/2075* (2013.01); *B60L 1/003* (2013.01); *B60L 7/14* (2013.01); *B60L 11/005* (2013.01);
(Continued)

(58) Field of Classification Search
CPC ....... B60W 10/06; B60W 20/00; B60K 6/485; B60L 1/003; B60L 7/14; B60L 11/005;
(Continued)

(56) References Cited

U.S. PATENT DOCUMENTS

| 6,672,415 B1 * | 1/2004 | Tabata | B60K 6/365 180/65.25 |
| 2006/0113129 A1 * | 6/2006 | Tabata | B60K 6/365 180/65.25 |

(Continued)

FOREIGN PATENT DOCUMENTS

| JP | 200328071 A | 1/2003 |
| JP | 200683550 A | 3/2006 |

(Continued)

*Primary Examiner* — Yazan Soofi
(74) *Attorney, Agent, or Firm* — Crowell & Moring LLP

(57) ABSTRACT

A construction machine including an internal combustion engine controlled based on a torque command, an electric motor mechanically connected to the internal combustion engine, and an electric energy storage device that supplies electric power to the electric motor, the construction machine performing work by driving a hydraulic pressure generator using the internal combustion engine and the electric motor, the construction machine including: a speed control device that controls a speed of the electric motor based on a speed command; and a torque limiter that limits the torque command relative to a torque target, wherein the torque command is limited by the torque limiter in such a manner that a rate of change with time of the torque command is limited to be equal to or less than a predetermined value.

7 Claims, 11 Drawing Sheets

(51) Int. Cl.
| | |
|---|---|
| B60L 1/00 | (2006.01) |
| B60L 7/14 | (2006.01) |
| B60L 11/00 | (2006.01) |
| B60L 11/12 | (2006.01) |
| B60L 11/18 | (2006.01) |
| B60L 15/20 | (2006.01) |
| E02F 9/20 | (2006.01) |
| B60W 10/08 | (2006.01) |
| B60W 20/00 | (2016.01) |
| B60W 20/16 | (2016.01) |
| E02F 3/32 | (2006.01) |
| B60W 50/00 | (2006.01) |

(52) U.S. Cl.
CPC ......... *B60L 11/123* (2013.01); *B60L 11/1862* (2013.01); *B60L 15/20* (2013.01); *B60L 15/2009* (2013.01); *B60W 10/06* (2013.01); *B60W 10/08* (2013.01); *B60W 20/00* (2013.01); *B60W 20/16* (2016.01); *E02F 3/32* (2013.01); *E02F 9/207* (2013.01); *B60K 6/485* (2013.01); *B60L 2200/40* (2013.01); *B60L 2220/14* (2013.01); *B60L 2220/42* (2013.01); *B60L 2240/421* (2013.01); *B60L 2240/423* (2013.01); *B60L 2240/443* (2013.01); *B60L 2240/445* (2013.01); *B60L 2240/549* (2013.01); *B60L 2240/80* (2013.01); *B60L 2270/12* (2013.01); *B60W 2050/0055* (2013.01); *B60W 2300/17* (2013.01); *B60W 2510/0657* (2013.01); *B60W 2510/0661* (2013.01); *B60W 2510/081* (2013.01); *B60W 2510/083* (2013.01); *B60W 2510/30* (2013.01); *B60W 2710/081* (2013.01); *Y02T 10/6217* (2013.01); *Y02T 10/6226* (2013.01); *Y02T 10/6286* (2013.01); *Y02T 10/645* (2013.01); *Y02T 10/648* (2013.01); *Y02T 10/7005* (2013.01); *Y02T 10/705* (2013.01); *Y02T 10/7022* (2013.01); *Y02T 10/7044* (2013.01); *Y02T 10/7077* (2013.01); *Y02T 10/72* (2013.01); *Y02T 10/7275* (2013.01); *Y10S 903/902* (2013.01)

(58) Field of Classification Search
CPC .... B60L 11/1862; B60L 11/123; B60L 15/20; B60L 15/2009; E02F 9/207; E02F 9/2075
USPC .......................................................... 701/22
See application file for complete search history.

(56) References Cited

U.S. PATENT DOCUMENTS

| | | |
|---|---|---|
| 2008/0154466 A1 | 6/2008 | Shenoy et al. |
| 2009/0243518 A1* | 10/2009 | Itoh ........................ B60K 6/365 318/98 |
| 2010/0160111 A1 | 6/2010 | Yamanaka et al. |
| 2011/0167811 A1 | 7/2011 | Kawaguchi et al. |
| 2012/0240582 A1 | 9/2012 | Ooki et al. |
| 2013/0218387 A1 | 8/2013 | Otsubo et al. |

FOREIGN PATENT DOCUMENTS

| | | |
|---|---|---|
| JP | 2009216058 A | 9/2009 |
| JP | 2010106511 A | 5/2010 |

* cited by examiner

CONSTRUCTION MACHINE

TECHNICAL FIELD

The present invention relates generally to construction machines and, more particularly, to a construction machine that performs work hydraulically by driving a hydraulic pressure generator with an internal combustion engine and an electric motor.

BACKGROUND ART

A known technique in a hybrid construction machine accurately brings an engine to a target operating state by causing a motor generator to assist the engine or to generate electricity through an as simple as possible configuration (see, for example, patent document 1). To achieve that task, the technique disclosed in patent document 1 incorporates a controller that obtains an engine speed corresponding to optimum torque of a set speed as a target speed and performs the following control so as to bring the engine close to an optimum operating state. Specifically, when the engine speed is lower than the target speed because of a large load torque on the engine, the controller causes the motor generator to operate as an electric motor according to a difference therebetween to thereby assist torque. When the engine speed is higher than the target speed because of a small load torque on the engine, the controller causes the motor generator to operate as a generator according to the difference therebetween to thereby store the generated electricity in a battery.

Another known control technique is, even with a sharp increase in a hydraulic load, to increase driving power supplied to a hydraulic pressure generator in response to the increase in the hydraulic load, while maintaining appropriate operating conditions of an internal combustion engine (see, for example, patent document 2). To achieve that task, the technique disclosed in patent document 2, while causing the internal combustion engine to drive the hydraulic pressure generator, sets a rate of increase in an output of the internal combustion engine to a predetermined value. An output upper limit value of the internal combustion engine obtained from the predetermined value of the rate of increase is then compared with a driving power requirement obtained from a hydraulic pressure output that the hydraulic pressure generator is required to produce. The output of the internal combustion engine is then controlled so as to be equal to, or smaller than, the output upper limit value when the driving power requirement exceeds the output upper limit value.

PRIOR ART DOCUMENTS

Patent Documents

Patent Document 1: JP-2003-28071-A
Patent Document 2: JP-2009-216058-A

SUMMARY OF THE INVENTION

Problem to be Solved by the Invention

The technique disclosed in patent document 1 does not, however, consider a transient state when the load torque undergoes a sudden change and thus involves an unavoidable situation in which a rate of change with time in the output torque of the engine as an internal combustion engine becomes high. This requires excessive fuel injection and may produce a large amount of particulate matter (PM) or nitrogen oxide (NOx).

The technique disclosed in patent document 2 controls an electric motor based on the output requirement of the hydraulic pressure generator and thus requires the output requirement of the hydraulic pressure generator. With construction machines, however, it is difficult to identify a load on a work implement, to detect a flow rate of hydraulic fluid in detail, and thus to accurately detect or estimate the output requirement. Moreover, because the electric motor is controlled without having feedback information on states of the engine, an error involved with the output requirement hampers accurate control of the rate of change with time in the engine output torque. For these reasons, a large amount of particulate matter (PM) or nitrogen oxide (NOx) may be produced, as with patent document 1.

An object of the present invention is to provide a construction machine that can reduce particulate matter (PM) or nitrogen oxide (NOx) discharged from an internal combustion engine mounted on the construction machine.

Means for Solving the Problem

To achieve the foregoing object, the present invention provides a construction machine including an internal combustion engine controlled based on a torque command, an electric motor mechanically connected to the internal combustion engine, an electric energy storage device that supplies electric power to the electric motor and a hydraulic pressure generator. The construction machine performs work by driving the hydraulic pressure generator using the internal combustion engine and the electric motor. The construction machine includes: first control means that controls a speed of the electric motor based on a speed command; and second control means that obtains the torque command having a rate of change with time limited based on a torque target.

The present invention further provides a construction machine including an internal combustion engine, an electric motor mechanically connected to the internal combustion engine, an electric energy storage device that supplies electric power to the electric motor and a hydraulic pressure generator. The construction machine performs work by driving the hydraulic pressure generator using the internal combustion engine and the electric motor. The electric motor is speed-controlled by a speed command, and torque of the internal combustion engine is greater than torque of the electric motor when a rate of change with time in torque of the hydraulic pressure generator is low, and the torque of the electric motor is greater than the torque of the internal combustion engine when the rate of change with time in the torque of the hydraulic pressure generator is high.

The present invention still further provides a construction machine including: an internal combustion engine; an electric motor mechanically connected to the internal combustion engine; an electric energy storage device that supplies electric power to the electric motor; and a hydraulic pressure generator. The construction machine performs work by driving the hydraulic pressure generator using the internal combustion engine and the electric motor. The electric motor is speed-controlled by the speed command, and a change of a rate of change with time in torque of the internal combustion engine is higher than a change of a rate of change with time in torque of the hydraulic pressure generator when the rate of change with time in the torque of the hydraulic pressure generator is low, and the change of the rate of change with time in the torque of the internal combustion engine is lower than the change of the rate of change with time in the torque of the hydraulic pressure generator when the rate of change with time in the torque of the hydraulic pressure generator is high.

Such arrangements allow the particulate matter (PM) or the nitrogen oxide (NOx) discharged from the internal combustion engine mounted on the construction machine to be reduced.

Effect of the Invention

The present invention can reduce the particulate matter (PM) or the nitrogen oxide (NOx) discharged from the internal combustion engine mounted on the construction machine.

MODES FOR CARRYING OUT THE INVENTION

Arrangements and operations of a construction machine according to a first embodiment of the present invention will be described below with reference to FIGS. 1 to 8. The following description assumes that the construction machine is a hydraulic excavator as a representative construction machine.

A general arrangement of the construction machine according to the first embodiment of the present invention will be described with reference to FIG. 1.

Figure 1:
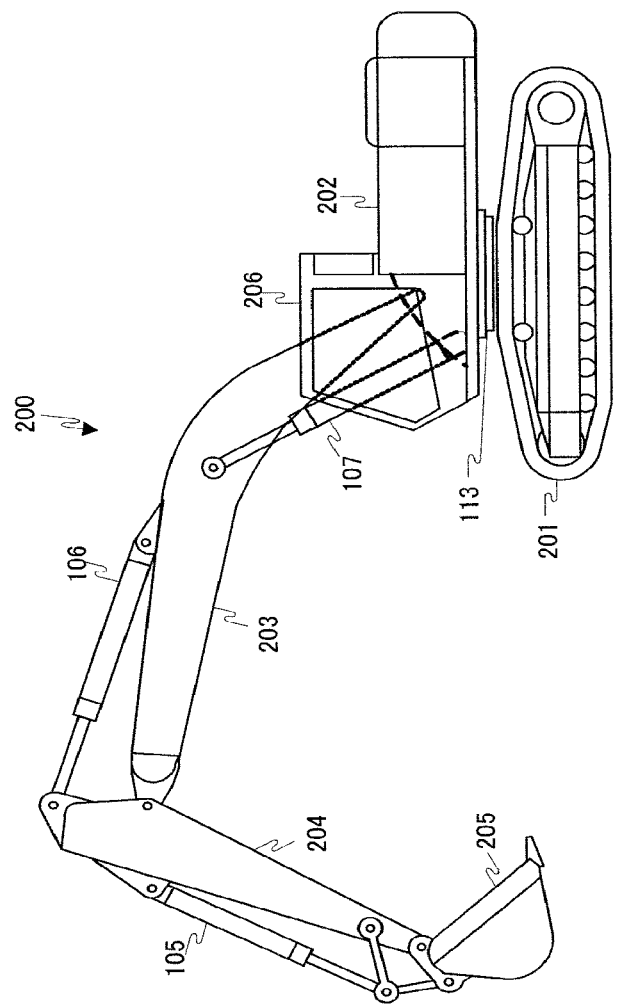
FIG. 1 is a side view showing a general arrangement of a construction machine according to a first embodiment of the present invention.

FIG. 1 is a side view showing the general arrangement of the construction machine according to the first embodiment of the present invention.

A hydraulic excavator 200 includes a track structure 201 and a swing structure 202. The track structure 201 has a function of causing the construction machine to travel with a track hydraulic motor. The track structure 201 includes a right track structure and a left track structure, each being driven by an independent track hydraulic motor. The swing structure 202 is rotated relative to the track structure 201 by a swing mechanism 113.

The swing structure 202 includes a boom 203, an arm 204, and a bucket 205 that perform excavating work, the boom 203, the arm 204, and the bucket 205 being disposed on the one side (e.g., on the right-hand side, looking to the front) at a front portion of the swing structure 202. The boom 203, the arm 204, and the bucket 205 are driven by a hydraulic cylinder 107, a hydraulic cylinder 106, and a hydraulic cylinder 105, respectively.

The swing structure 202 further includes a cab 206. An operator gets on board the cab 206 and uses an operating lever to operate the construction machine 200.

An arrangement of a drive system that drives the construction machine according to the first embodiment will be described below with reference to FIG. 2.

Figure 2:
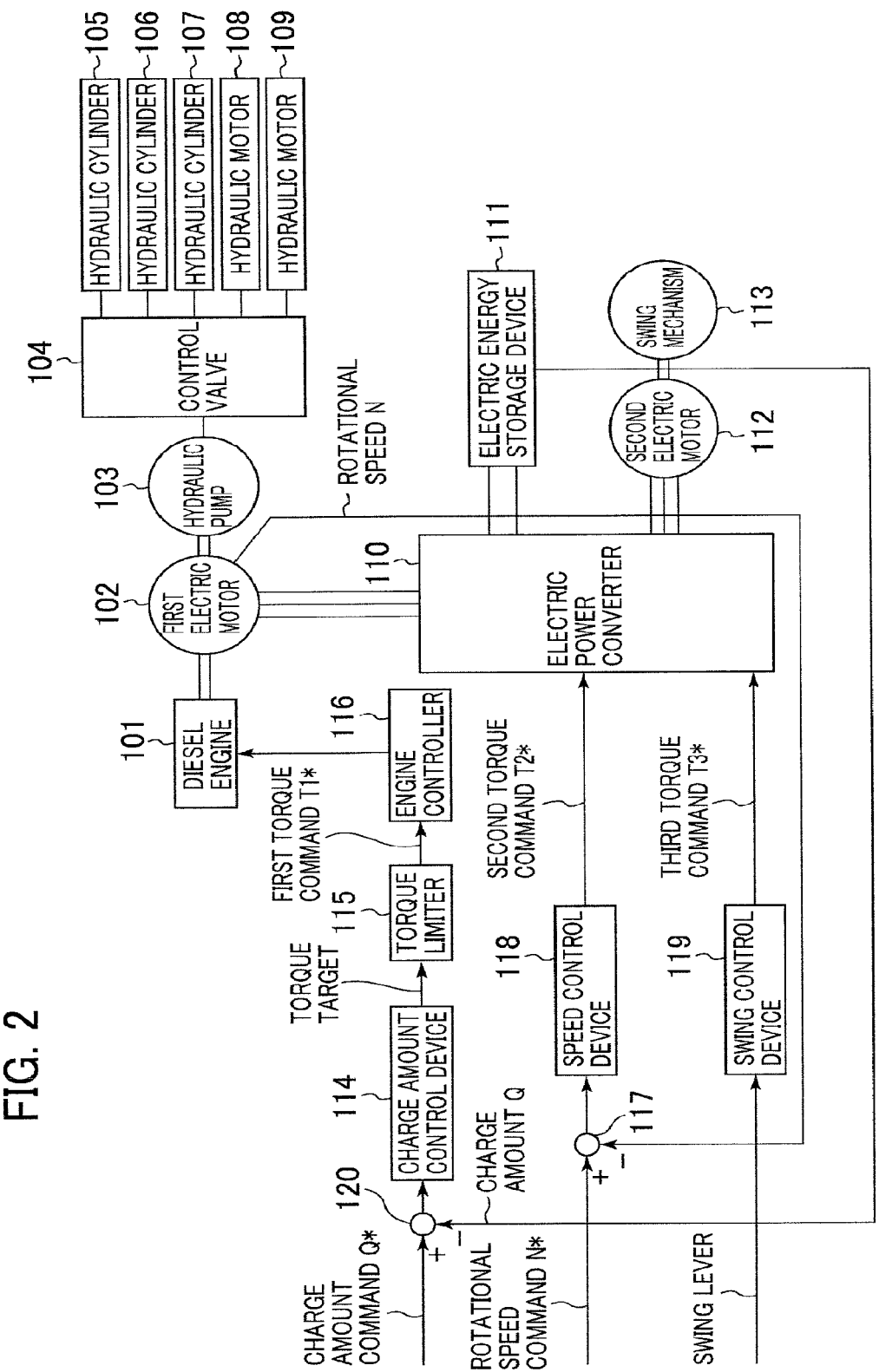
FIG. 2 is a block diagram showing an arrangement of a drive system that drives the construction machine according to the first embodiment of the present invention.

FIG. 2 is a block diagram showing the arrangement of the drive system that drives the construction machine according to the first embodiment of the present invention.

A diesel engine 101 as an internal combustion engine and a first electric motor 102 are mechanically connected to each other to thereby drive a hydraulic pump 103 as a hydraulic pressure generator. It is here noted that, for example, the diesel engine 101, the first electric motor 102, and the hydraulic pump 103 are mechanically connected so as to run at an identical speed. Hydraulic fluid sent from the hydraulic pump 103 is distributed by a control valve 104 based on an operation by the operator and supplied to the hydraulic cylinders 105, 106 and 107, a left track hydraulic motor 108, and a right track hydraulic motor 109. The hydraulic cylinder 105 drives the bucket 205 shown in FIG. 1. The hydraulic cylinder 106 drives the arm 204 shown in FIG. 1. The hydraulic cylinder 107 drives the boom 203 shown in FIG. 1. The left track hydraulic motor 108 and the right track hydraulic motor 109 drive the left track structure and the right track structure, respectively, of the track structure 201 shown in FIG. 1.

The first electric motor 102 and a second electric motor 112 that drives the swing mechanism 113 are each a three-phase synchronous motor and a motor generator. An electric power converter 110 converts direct current (DC) electric power stored in an electric energy storage device 111 to three-phase alternating current (AC) electric power and supplies the three-phase AC electric power to, and thereby drive, the first electric motor 102 and the second electric motor 112. The first electric motor 102 is also operated as a generator to charge the electric energy storage device 111 via the electric power converter 110. The second electric motor 112 operates as a generator when the swing structure 202 rotating is to be braked, thereby charging the electric energy storage device 111 via the electric power converter 110.

A capacitor having a relatively small capacity is used for the electric energy storage device 111. In this case, a charge amount of the electric energy storage device 111 needs to be appropriately controlled.

A subtractor 120 calculates a difference between a charge amount command Q* and a charge amount Q of the electric energy storage device 111. The charge amount command Q* is given by a host controller and is a predetermined value that corresponds to, for example, an 80% charge amount of the electric energy storage device 111.

A charge amount control device 114 calculates and outputs a torque target so that the difference obtained by the subtractor 120 becomes equal to 0, specifically, the charge amount Q of the electric energy storage device 111 agrees with the charge amount command Q*. A torque limiter 115 obtains and outputs a first torque command T1* that limits a rate of change with time relative to the torque target output by the charge amount control device 114. If, for example, the torque target value changes in a step fashion, the torque target value is made to change gradually, so that the rate of change with time in the torque target may be limited to a level below a predetermined value.

An engine controller 116 controls the diesel engine 101 so that output torque of the diesel engine 101 becomes equal to the first torque command T1*. Specifically, the engine controller 116 controls an amount of fuel supplied by a fuel injection valve of the diesel engine 101 to a combustion chamber of the diesel engine 101 or an EGR recirculation amount.

A subtractor 117 calculates a difference between a rotational speed command N* and a rotational speed N of the first electric motor. The rotational speed command N* is given by a host controller and is, for example, a predetermined value.

A speed control device 118 obtains a second torque command T2* based on the difference calculated by the subtractor 117 so that the rotational speed command N* agrees with the rotational speed N of the first electric motor and outputs the second torque command T2* to the electric power converter 110. The electric power converter 110 controls so that torque of the first electric motor 102 becomes equal to the second torque command T2*.

A swing control device 119 obtains a third torque command T3* based on an operating amount of a swing lever operated by the operator and outputs the third torque command T3* to the electric power converter 110 in order to control the second electric motor 112. The electric power converter 110 controls so that torque of the second electric motor 112 becomes equal to the third torque command T3*.

The electric power converter 110 includes first and second electric power converting portions built therein, the first electric power converting portion controlling the first electric motor 102, the second electric power converting portion controlling the second electric motor 112. For example, the first electric power converting portion includes a plurality of switching elements and a control part. The switching elements convert DC electric power to three-phase AC electric power. The control part performs PWM control for opening or closing the switching elements so that current flowing through the first electric motor 102 agrees with a current command corresponding to the abovementioned second torque command T2*. The first electric power converting portion thereby controls so that the torque of the first electric motor 102 becomes equal to the second torque command T2*. Additionally, when the first electric motor 102 operates as a generator, the control part controls the switching elements and converts an output of electric power generated by the first electric motor 102 to DC electric power and stores the DC electric power in the electric energy storage device 111. The second electric power converting portion, having arrangements and operations identical to those of the first electric power converting portion, controls so that the torque of the second electric motor 112 becomes equal to the third torque command T3*. When the second electric motor 112 operates as a generator, the control part controls the switching elements and converts an output of electric power generated by the second electric motor 112 to DC electric power and stores the DC electric power in the electric energy storage device 111.

Operations of the drive system incorporated in the construction machine according to the first embodiment will be described below with reference to FIGS. 3 to 8.

FIGS. 3 to 8 are timing charts showing the operations of the drive system incorporated in the construction machine according to the first embodiment of the present invention.

Operations of different parts of the drive system when, for example, the arm is operated will first be described below with reference to FIG. 3.

Figure 3:
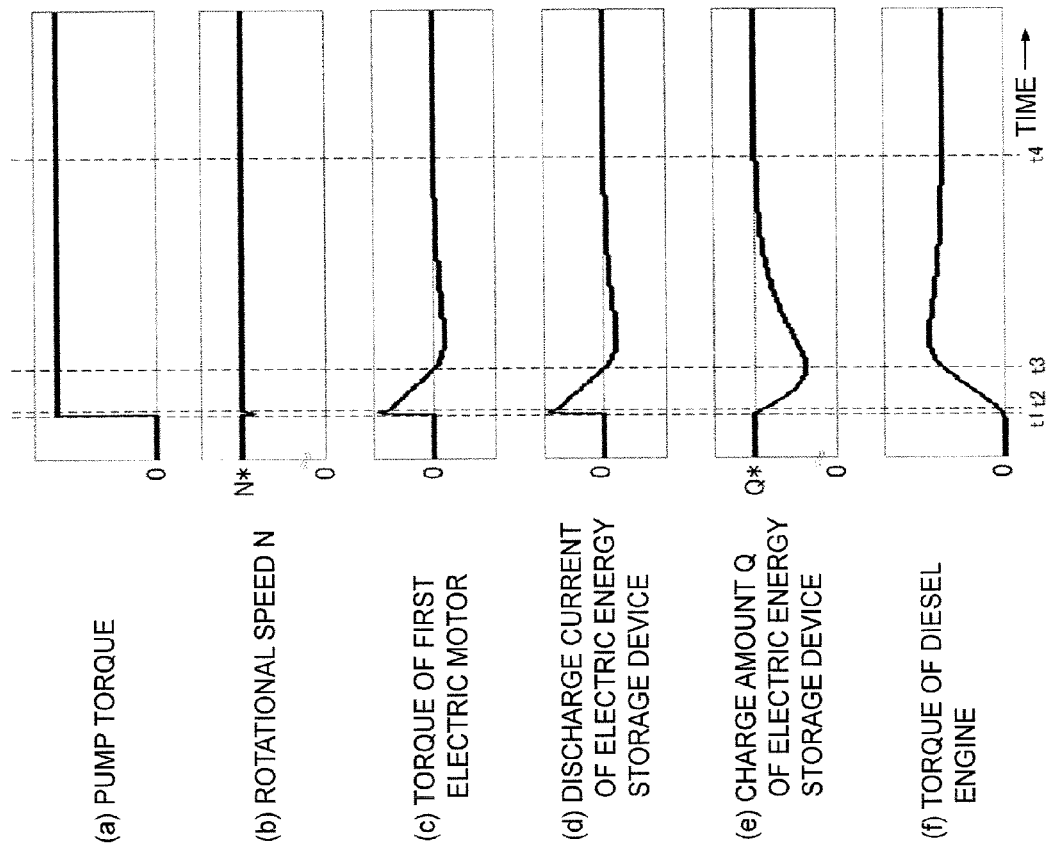
FIG. 3 is a set of timing charts showing operations of the drive system incorporated in the construction machine according to the first embodiment of the present invention.

The abscissas on FIG. 3 represent elapsed time. The ordinate on FIG. 3(a) represents pump torque of the hydraulic pump 103 and the ordinate on FIG. 3(b) represents the rotational speed N of the first electric motor 102. It is assumed that the diesel engine 101, the first electric motor 102, and the hydraulic pump 103 are mechanically connected so as to run at an identical speed. The ordinate on FIG. 3(c) represents torque of the first electric motor 102 and the ordinate on FIG. 3(d) represents discharge current of the electric energy storage device 111. The ordinate on FIG. 3(e) represents the charge amount Q of the electric energy storage device 111 and the ordinate on FIG. 3(f) represents torque of the diesel engine 101. FIG. 3 then shows that torque of the hydraulic pump 103 increases as a result of an operation performed by the operator at time t1. One of the cases in which the torque of the hydraulic pump 103 increases as a result of an operation of the operator is when, for example, the operator operates an operating lever for the bucket 205 shown in FIG. 1 and the torque of the hydraulic pump 103 is increased to drive the hydraulic cylinder 105 according to the operation. Other possible cases include when each one of the boom 203, the arm 204 or the track structure 201 is driven.

When the torque of the hydraulic pump 103 is increased at time t1 as shown in FIG. 3(a), the rotational speed N decreases as shown in FIG. 3(b) with a resultant increase in the difference from the rotational speed command N*; this increases the second torque command T2*, which increases the torque of the first electric motor 102 as shown in FIG. 3(c). This causes the rotational speed N to start increasing and to recover at time t2 as shown in FIG. 3(b). Specifically, even with fluctuations in pump torque, the speed control device 118 controls the torque of the first electric motor 102 and the rotational speed N is maintained at a constant level.

When the torque of the first electric motor 102 is increased at time t1 as shown in FIG. 3(c), the discharge current of the electric energy storage device 111 increases at time t1 to supply electric power as shown in FIG. 3(d) and the charge amount Q decreases as shown in FIG. 3(e). This increases the difference from the charge amount command Q* calculated by the subtractor 120, which increases the engine torque target output by the charge amount control device 114. The torque target is subject to limitation of the rate of change with time imposed by the torque limiter 115 and output as the first torque command T1* to the engine controller 116. FIG. 3(f) shows the diesel engine torque when the rate of change with time in the first torque command T1* is limited as described above. Changes in torque after time t1 follow the rate of change with time limited by the torque limiter 115 or lower. This eliminates the likelihood that the diesel engine 101 will change its torque sharply and allows the diesel engine 101 to avoid combustion in a condition of high equivalence ratios due to excessive fuel injection with which particulate matter tends to be produced or in a condition of excessive combustion temperatures at which nitrogen oxide tends to be produced.

When the torque of the diesel engine 101 increases at time t2 to time t3 as shown in FIG. 3(f), the torque of the first electric motor 102 decreases in proportion thereto as shown in FIG. 3(c). This is because of the torque of the first electric motor 102 being controlled so that a sum of the torque of the diesel engine 101 and the torque of the first electric motor 102 balances the pump torque to thereby keep the rotational speed N constant.

The control at time t2 to time t3 will be described in greater detail below. Because the charge amount Q of the electric energy storage device 111 decreases at time t2, the difference output by the subtractor 120 increases. Accordingly, the torque target value output by the charge amount control device 114 increases. The engine controller 116 controls the output torque of the diesel engine 101 according to the torque target value, which causes the torque of the diesel engine 101 to increase gradually as shown in FIG. 3(f). Meanwhile, when the output torque of the diesel engine 101 increases, the rotational speed of the diesel engine 101 increases and the rotational speed of the first electric motor 102 connected to the diesel engine 101 also increases. As a result, the speed difference output by the subtractor 117 increases. This causes the second torque command T2* output by the speed control device 118 to decrease. The torque of the first electric motor 102, being controlled by the electric power converter 110 according to the second torque command T2*, gradually decreases as shown in FIG. 3(c).

When the torque of the diesel engine 101 exceeds the pump torque at time t3, the torque of the first electric motor 102 becomes negative, specifically, the first electric motor 102 performs an electric power generating operation and the diesel engine 101 drives the first electric motor 102 that performs the electric power generating operation as well as the hydraulic pump 103. In addition, the electric power generated by the first electric motor 102 is supplied to the electric energy storage device 111, which causes the charge amount Q to start increasing toward the charge amount command Q* as shown in FIG. 3(e).

At time t4, the charge amount Q shown in FIG. 3(e) substantially agrees with the charge amount command Q*. At this time, the torque of the first electric motor 102 is 0 as shown in FIG. 3(c) and the torque of the diesel engine 101 balances the pump torque with the rotational speed N controlled at the rotational speed command N*.

Figure 4:
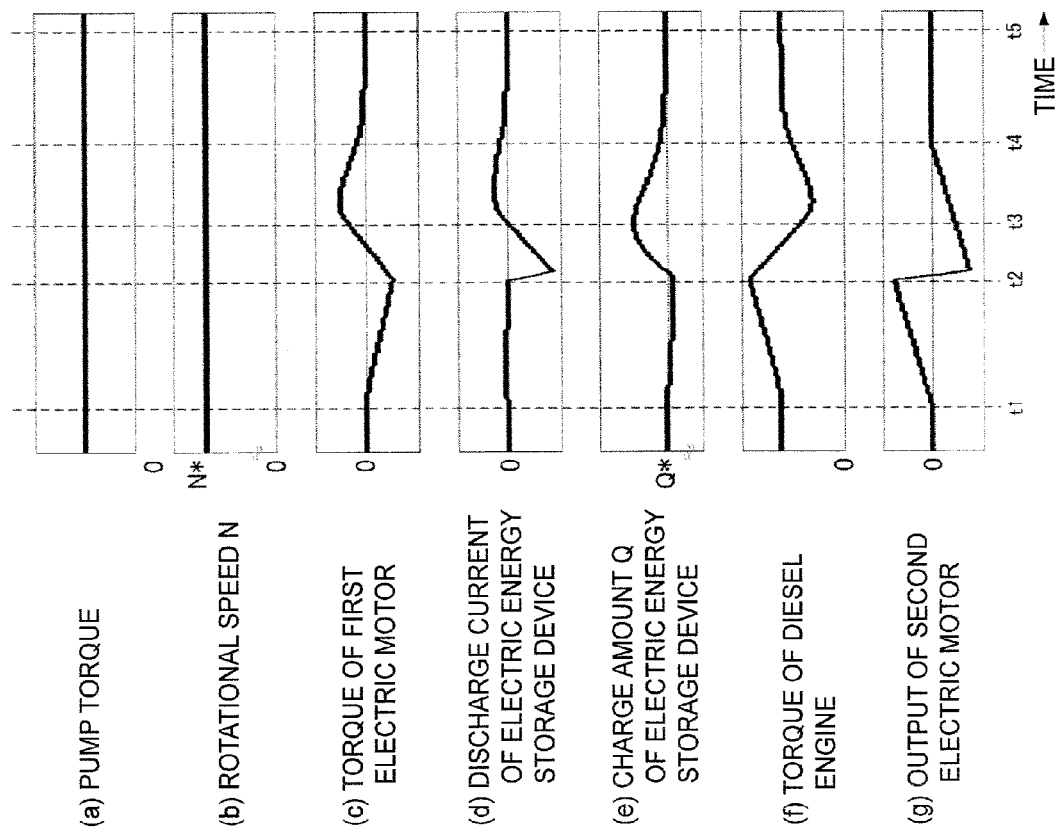
FIG. 4 is a set of timing charts showing operations of the drive system incorporated in the construction machine according to the first embodiment of the present invention.

Operations of different parts of the drive system when the swing structure 202 performs a swing operation will be described below with reference to FIG. 4. The ordinates on FIGS. 4(a) to 4(f) represent the same as those on FIGS. 3(a) to 3(f). FIG. 4(g) shows the output of the second electric motor 112. FIG. 4 shows that the second electric motor 112 is started by an operation of the swing lever performed by the operator at time t1, the second electric motor 112 is braked by an operation of the swing lever performed by the operator at time t2, and the second electric motor 112 is brought to a stop at time t4.

When the second electric motor 112 starts rotating at time t1, the rotational speed starts increasing, which increases the output of the second electric motor 112 as shown in FIG. 4(g). Accordingly, to prevent the charge amount Q of the electric energy storage device 111 from being decreased due to an increase in the discharge current of the electric energy storage device 111, the torque target output by the charge amount control device 114 increases. This increases the torque of the diesel engine 101 as shown in FIG. 4(f).

Meanwhile, to prevent the rotational speed N from increasing due to the increase in the torque of the diesel engine 101, the speed control device 118 decreases the second torque command T2*. This makes the torque of the first electric motor 102 negative as shown in FIG. 4(c). The first electric motor 102 then performs the electric power generating operation and the discharge current of the electric energy storage device 111 is prevented from increasing, so that the charge amount Q can be prevented from decreasing. Specifically, the torque of the diesel engine 101 increases in proportion to the output of the second electric motor 112. The first electric motor 102 then generates electric power with the increased torque, so that the rotational speed N and the charge amount Q are controlled so as to agree with the rotational speed command N* and the charge amount command Q*, respectively. It is noted that the rate of change with time in the torque target associated with the increase in the output of the second electric motor 112 at this time is equal to, or lower than, the limited value and the first torque command T1* agrees with the torque target.

Through the foregoing control, at time t1 to time t2, the torque of the diesel engine 101 increases as shown in FIG. 4(f) and the torque of the first electric motor 102 decreases (the amount of electric power generated increases) as shown in FIG. 4(c), in proportion to the increase in the output of the second electric motor 112 as shown in FIG. 4(g).

When deceleration of the second electric motor 112 is started at time t2, the output suddenly changes from powering to regeneration. The output of the second electric motor 112 undergoes a sudden change from positive to negative as shown in FIG. 4(g). Accordingly, in order to absorb electric power regenerated by the second electric motor 112 and electric power generated by the first electric motor 102, the discharge current of the electric energy storage device 111 is decreased as shown in FIG. 4(d), specifically, charging of the electric energy storage device 111 is started as shown in FIG. 4(e) to increase the charge amount Q. As the charge amount Q increases, the torque target is decreased by the charge amount control device 114. At this time, the torque target tends to change sharply because of the precipitous change in the output of the second electric motor 112; however, because of the rate of change in the first torque command T1* being limited by the torque limiter 115, the torque of the diesel engine 101 does not change precipitously, as shown in FIG. 4(f).

This prevents the diesel engine 101 from changing its torque precipitously and allows the diesel engine 101 to avoid combustion in a condition of high equivalence ratios due to excessive fuel injection with which particulate matter tends to be produced or in a condition of excessive combustion temperatures at which nitrogen oxide tends to be produced.

The torque of the first electric motor 102 with its rotational speed N controlled at a constant level increases with the decreasing torque of the diesel engine 101 as shown in FIG. 4(c) and the amount of electric power generated by the first electric motor 102 decreases slowly. Thus, the charge amount Q continues to increase for some while.

The torque of the first electric motor 102 continues to increase and the first electric motor 102 shifts from an electric power generating state to a powering state. Then, when power consumption exceeds the electric power regenerated by the second electric motor 112 at time t3, the charge amount Q starts decreasing as shown in FIG. 4(e). When the charge amount Q decreases, the torque target is increased by the charge amount control device 114 and, as shown in FIG. 4(f), the torque of the diesel engine 101 increases. To prevent the rotational speed N from increasing due to the increase in the torque of the diesel engine 101, the speed control device 118 decreases the torque of the first electric motor 102 and the discharge current of the electric energy storage device 111 decreases as shown in FIG. 4(d).

As a result, the following conditions develop at time t5: specifically, the torque of the first electric motor 102 is 0 as shown in FIG. 4(c), the discharge current of the electric energy storage device 111 is 0 as shown in FIG. 4(d), the charge amount Q agrees with the charge amount command Q* as shown in FIG. 4(e), and the torque of the diesel engine 101 agrees with the pump torque.

As described above, even when the second electric motor 112 performs powering and regenerative operations as a result of a swing operation, the rotational speed N is controlled so as to agree with the rotational speed command N*, the rate of change with time in the torque of the diesel engine 101 can be limited, and the charge amount Q of the electric energy storage device 111 is controlled so as to agree with the charge amount command Q*.

Changes with time of the pump torque, the rotational speed N, the torque of the first electric motor 102, and the torque of the diesel engine 101 when the rate of change with time in the pump torque is changed will be described below with reference to FIGS. 5 to 8.

FIGS. 5 to 8 are each concerned with a specific condition of the rate of change with time in the pump torque, the conditions being labeled as condition 1 to condition 4. Conditions 1 and 2 show cases with low rates of change with time in the pump torque and conditions 3 and 4 show cases with high rates of change with time in the pump torque. Conditions 2 and 4 are concerned with rates of change with time in the pump torque twice as high as those of conditions 1 and 3, respectively.

The abscissas on FIGS. 5 to 8 represent time. The ordinate on FIG. 5(a) represents the pump torque of the hydraulic pump 103 and the ordinate on FIG. 5(b) represents the rotational speed N of the first electric motor 102. It is assumed that the diesel engine 101, the first electric motor 102, and the hydraulic pump 103 are mechanically connected so as to run at an identical speed. The ordinate on FIG. 5(c) represents the torque of the first electric motor 102 and the ordinate on FIG. 5(f) represents the torque of the diesel engine 101. The broad dotted line on FIG. 5(f) is a reference line that serves as a guide easily determining an inclination of a torque line. The ordinates on FIGS. 6(a) to 6(c) and 6(f) to FIGS. 8(a) to 8(c) and 8(f) represent the same as those represented by the ordinates on FIGS. 5(a) to 5(c) and 5(f).

Figure 5:
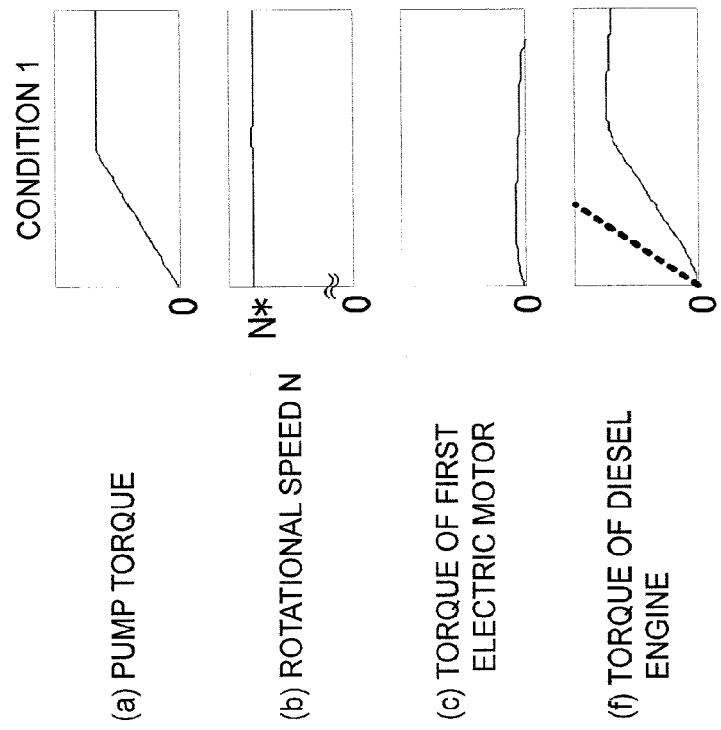
FIG. 5 is a set of timing charts showing operations of the drive system incorporated in the construction machine according to the first embodiment of the present invention.
Figure 6:
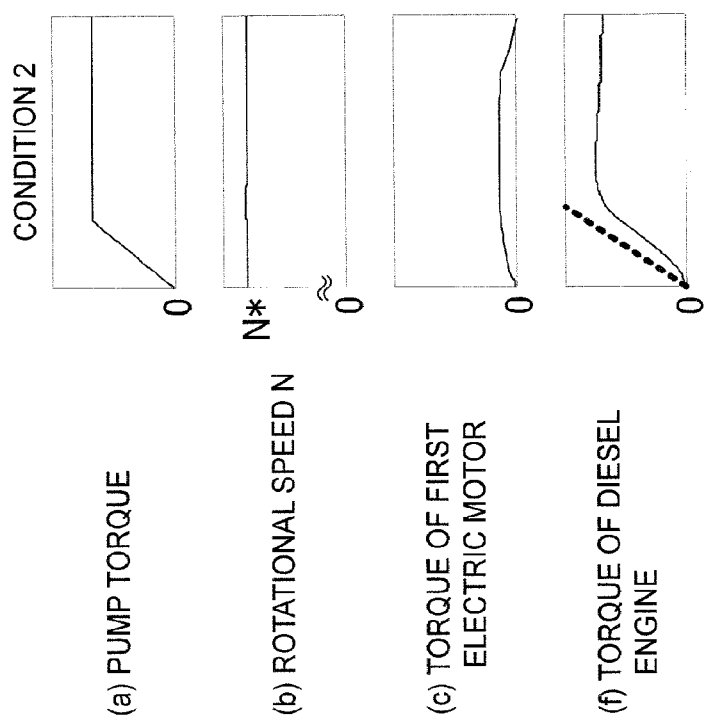
FIG. 6 is a set of timing charts showing operations of the drive system incorporated in the construction machine according to the first embodiment of the present invention.

In condition 1 (FIG. 5) and condition 2 (FIG. 6), because of the low rates of change with time in the pump torque as shown in FIGS. 5(a) and 6(a), the torque of the diesel engine 101 can follow the increase in the pump torque as shown in FIGS. 5(f) and 6(f). This eliminates the need for making the torque of the first electric motor 102 large and, as shown in FIGS. 5(c) and 6(c) and the torque of the first electric motor 102 is smaller than the torque of the diesel engine 101 at the peak of the torque of the first electric motor 102.

Figure 7:
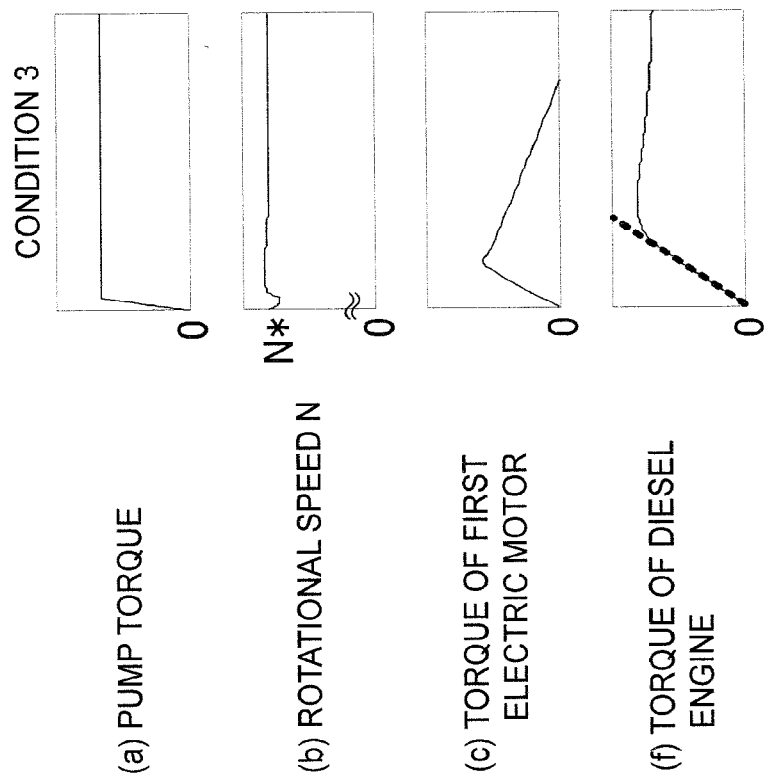
FIG. 7 is a set of timing charts showing operations of the drive system incorporated in the construction machine according to the first embodiment of the present invention.
Figure 8:
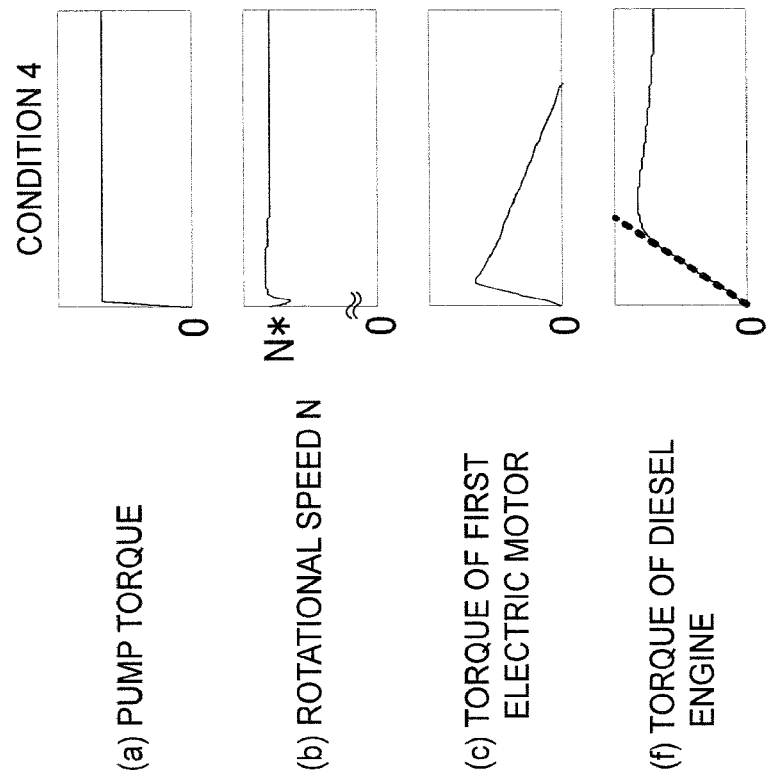
FIG. 8 is a set of timing charts showing operations of the drive system incorporated in the construction machine according to the first embodiment of the present invention.

In contrast, in condition 3 (FIG. 7) and condition 4 (FIG. 8), because of the high rates of change with time in the pump torque as shown in FIGS. 7(a) and 8(a), the torque of the diesel engine 101 cannot follow the increase in the pump torque. To maintain the rotational speed N, the torque of the first electric motor 102 needs to be made large as shown in FIGS. 7(c) and 8(c) and becomes larger than the torque of the diesel engine 101 at the peak of the torque of the first electric motor 102.

Attention is now focused on the rate of change with time in the pump torque of the diesel engine 101 when the rate of change with time in the pump torque changes from condition 1 to condition 2 in conditions 1 and 2 having the low rates of change with time in the pump torque. The rate of change with time in the torque of the diesel engine 101 in condition 2 (FIG. 6) changes greatly relative to that in condition 1 (FIG. 5). In contrast, in conditions 3 and 4 having the high rates of change with time in the pump torque, because of the limitation imposed by the torque limiter 115, the rate of change with time in the torque of the diesel engine 101 in condition 4 (FIG. 8) changes a little relative to that in condition 3 (FIG. 7) when the rate of change with time in the pump torque changes from condition 3 to condition 4. Specifically, when the rates of change with time in the pump torque are low (conditions 1 and 2), the increase in the rate of change with time in the torque of the diesel engine 101 relative to the increase in the rate of change with time in the pump torque is high; and when the rates of change with time in the pump torque are high (conditions 3 and 4), the increase in the rate of change with time in the torque of the diesel engine 101 relative to the increase in the rate of change with time in the pump torque is low.

In either case, because of the functioning of the speed control device 118, the rotational speed N is controlled so as to agree with the rotational speed command N*. Specifically, in the construction machine according to the first embodiment, the torque of the diesel engine 101 is controlled according to the pump torque when the rate of change with time in the pump torque is low; because the rate of change with time in the torque of the diesel engine 101 is low at this time, the diesel engine 101 does not develop a condition in which particulate matter and nitrogen oxide tend to be produced.

In contrast, when the rate of change with time in the pump torque is high, the rate of change with time in the torque of the diesel engine 101 is limited and is not controlled according to the pump torque. Thus, in this case, too, the rate of change with time in the torque of the diesel engine 101 is limited, so that the diesel engine 101 does not develop a condition in which particulate matter and nitrogen oxide tend to be produced.

As described heretofore, in the first embodiment, the particulate matter (PM) or the nitrogen oxide (NOx) discharged from the internal combustion engine mounted on the construction machine can be reduced and the charge amount of the electric energy storage device that supplies electric power to the electric motor can be appropriately controlled.

Additionally, the charge amount of a capacitor having a small capacity, if used for the electric energy storage device, can also be appropriately controlled.

Arrangements and operations of a construction machine according to a second embodiment of the present invention will be described below with reference to FIGS. 9 to 11. A hydraulic excavator as the construction machine according to the second embodiment has a general arrangement identical to that shown in FIG. 1.

An arrangement of a drive system that drives the construction machine according to the second embodiment will be described below with reference to FIG. 9.

Figure 9:
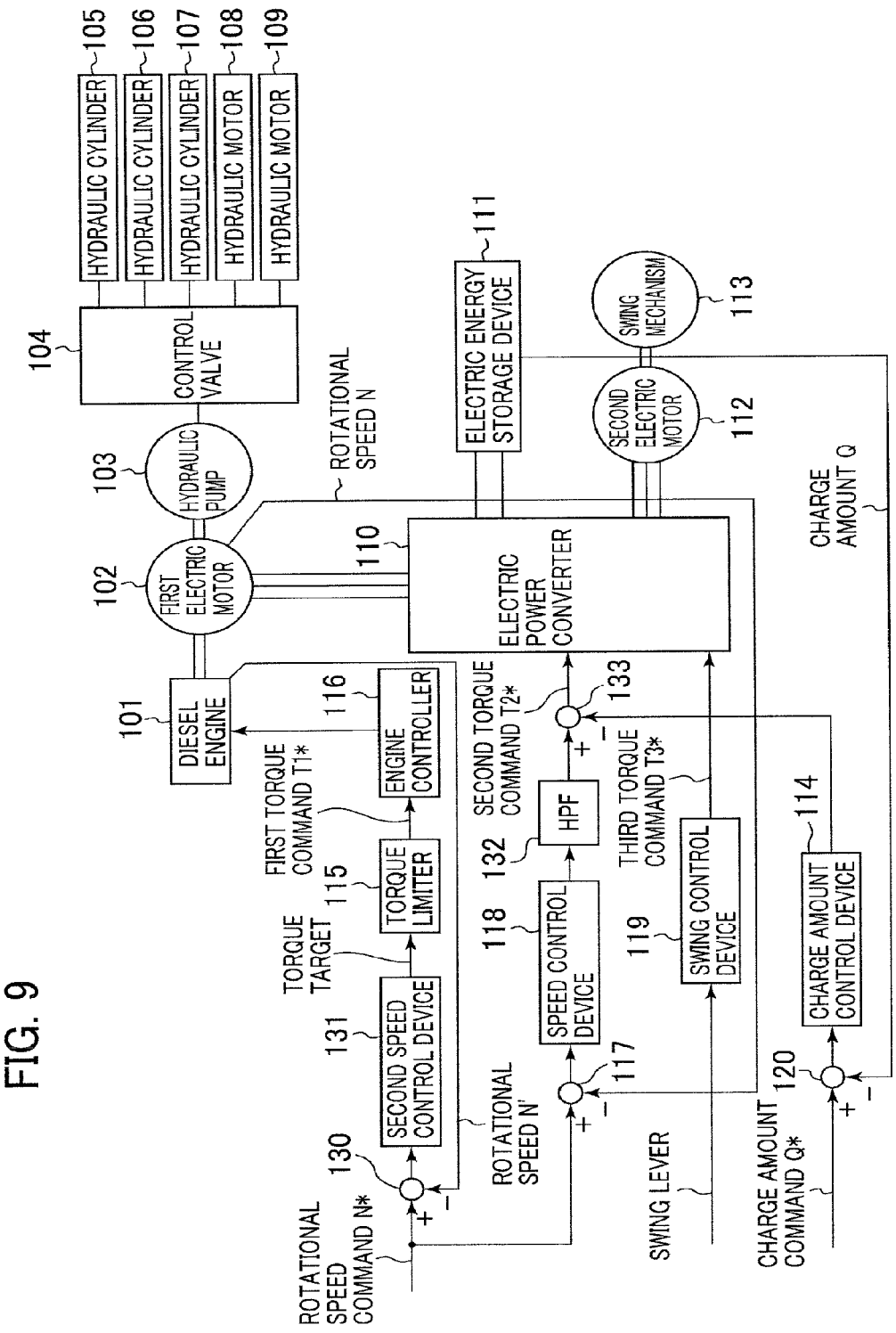
FIG. 9 is a block diagram showing an arrangement of a drive system that drives a construction machine according to a second embodiment of the present invention.

FIG. 9 is a block diagram showing the arrangement of the drive system that drives the construction machine according to the second embodiment of the present invention. Like or equal parts are identified by the same reference numerals as those used in FIG. 2.

Based on a difference between a rotational speed command N* and a rotational speed N' of a diesel engine 101 obtained by a subtractor 130, a second speed control device 131 calculates a torque target such that the rotational speed N' of the diesel engine 101 agrees with the rotational speed command N*. The second speed control device 131 then outputs the torque target to a torque limiter 115.

A high-pass filter 132 produces an output of a speed control device 118 from which a low-frequency component including a DC component is removed. A subtractor 133 subtracts an output of a charge amount control device 114 from the output of the high-pass filter 132 representing the output of the speed control device 118 from which the low-frequency component including the DC component is removed. The subtractor 133 then outputs the result as a second torque command T2*.

It is noted that the diesel engine 101 and a first electric motor 102 are mechanically connected to each other and thus run at an identical speed that will hereinafter be represented by a rotational speed N.

Operations of the drive system according to the second embodiment will be described below.

When torque of a hydraulic pump 103 changes, the second speed control device 131 limits fluctuations in the rotational speed N; still, the torque limiter 115 limits the rate of change in torque of the diesel engine 101. This prevents the diesel engine 101 from developing a condition in which particulate matter or nitrogen oxide tends to be produced. Meanwhile, because of the rate of change in the torque of the diesel engine 101 being limited, it is difficult to sufficiently limit the fluctuations in the rotational speed N only with the second speed control device 131. Thus, the fluctuations in the rotational speed N is limited transiently by the speed control device 118. In addition, because the low-frequency component is removed by the high-pass filter 132 in a steady state, control of the charge amount Q by the charge amount control device 114 is performed.

Operations of the drive system incorporated in the construction machine according to the second embodiment will be described below with reference to FIGS. 10 to 11.

Figure 10:
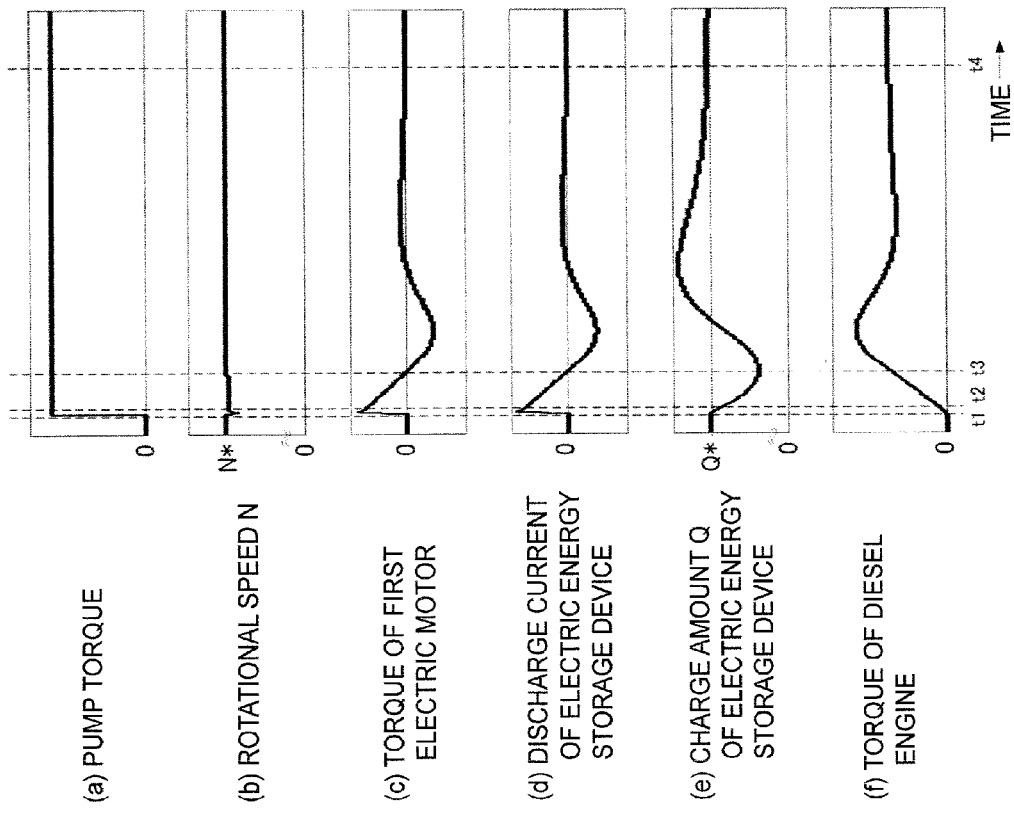
FIG. 10 is a set of timing charts showing operations of the drive system incorporated in the construction machine according to the second embodiment of the present invention.
Figure 11:
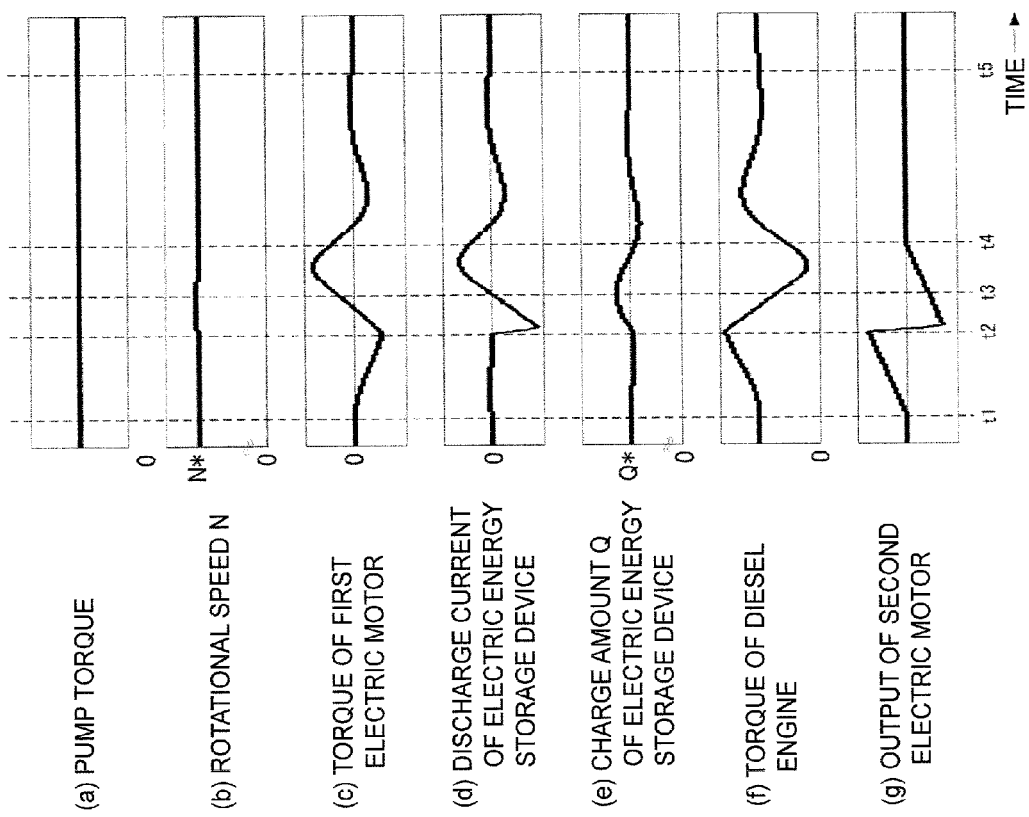
FIG. 11 is a set of timing charts showing operations of the drive system incorporated in the construction machine according to the second embodiment of the present invention.

FIGS. 10 and 11 are timing charts showing operations of the drive system incorporated in the construction machine according to the second embodiment of the present invention.

FIG. 10 shows operations of different parts of the drive system when, for example, the arm is operated and the pump torque is changed. The operations are the same as those described with reference to FIG. 3.

In this case, the rotational speed N is controlled so as to agree with the rotational speed command N*, the rate of change with time in the torque of the diesel engine 101 is limited, and the charge amount Q of an electric energy storage device 111 is controlled so as to agree with the charge amount command Q*.

FIG. 11 shows operations of different parts of the drive system when a second electric motor 112 is operated. The operations are the same as those described with reference to FIG. 4.

In this case, the rotational speed N is controlled so as to agree with the rotational speed command N*, the rate of change with time in the torque of the diesel engine 101 is limited, and the charge amount Q of the electric energy storage device 111 is controlled so as to agree with the charge amount command Q*.

As described heretofore, in the second embodiment, too, the particulate matter (PM) or the nitrogen oxide (NOx) discharged from the internal combustion engine mounted on the construction machine can be reduced and the charge amount of the electric energy storage device that supplies electric power to the electric motor can be appropriately controlled.

Additionally, the charge amount of a capacitor having a small capacity, if used for the electric energy storage device, can also be appropriately controlled.

In the above-described embodiments, a predetermined constant value is given as the rotational speed command N*. The rotational speed command N* may, however, be decreased for a light hydraulic pump load or increased for a heavy hydraulic pump load. Varying the rotational speed command N* in this manner still allows the rotational speed N to follow the rotational speed command N* because of the control performed based on the difference therebetween.

The rate of change with time of the torque limiter 115, while it has been described to be constant, may still be varied depending on the operating condition of the diesel engine 101 within a range in which the particulate matter or the nitrogen oxide does not increase to a level more than a predetermined amount. Additionally, an input to, and an output from, the torque limiter 115 are made to agree with each other such that the particulate matter or the nitrogen oxide does not increase to a level more than a predetermined amount and the torque limiter 115 may be configured so as to limit the rate of change with time in the output if the particulate matter or the nitrogen oxide increases to a level more than the predetermined amount with the input made to agree with the output.

Additionally, the diesel engine 101, the first electric motor 102, and the hydraulic pump 103 are mechanically connected so as to run at an identical speed. The connection may nonetheless be achieved via a transmission, in which case, the rotational speed command N*, the rotational speed N', and the rotational speed N need to be converted in consideration of a gear ratio.

DESCRIPTION OF REFERENCE NUMERALS

101 Diesel engine (internal combustion engine)
102 First electric motor
103 Hydraulic pump (hydraulic pressure generator)
104 Control valve
105, 106, 107 Hydraulic cylinder
108, 109 Hydraulic motor
110 Electric power converter
111 Electric energy storage device
112 Second electric motor
113 Swing mechanism
114 Charge amount control device
115 Torque limiter (second control means)
116 Engine controller
118 Speed control device (first control means)
119 Swing control device
131 Second speed control device
132 High-pass filter
200 Hydraulic excavator (exemplary construction machine)

The invention claimed is:

1. A construction machine comprising:
an internal combustion engine controlled based on a torque command;
an engine controller that controls the internal combustion engine such that an output torque of the internal combustion engine becomes equal to the torque command;
an electric motor mechanically connected to the internal combustion engine;

an electric energy storage device that supplies electric power to the electric motor, the construction machine performing work by driving a hydraulic pressure generator using the internal combustion engine and the electric motor;
a speed control device that controls a speed of the electric motor based on a speed command; and
a torque limiter that outputs a torque command relative to a torque target of the internal combustion engine to the controller, wherein
the torque limiter limits the torque command relative to the torque target of the internal combustion engine such that a rate of change with time of the torque target of the internal combustion engine becomes equal to or less than a predetermined value.

2. The construction machine according to claim 1, wherein
the internal combustion engine is controlled by a first torque command obtained based on the speed command and the speed, and
the speed control device
calculates a second torque command obtained based on the speed command and the speed of the electric motor,
further includes a high-pass filter that removes a low-frequency component including a DC component of the second torque command, and
controls the electric motor based on an output of the high-pass filter.

3. The construction machine according to claim 1, wherein
the electric motor is speed-controlled by the speed command, and
torque of the internal combustion engine is greater than torque of the electric motor when a rate of change with time in torque of the hydraulic pressure generator is low, and the torque of the electric motor is greater than the torque of the internal combustion engine when the rate of change with time in the torque of the hydraulic pressure generator is high.

4. The construction machine according to claim 1, wherein
the electric motor is speed-controlled by the speed command, and
a change of a rate of change with time in the torque of the internal combustion engine is higher than a change of a rate of change with time in the torque of the hydraulic pressure generator when the rate of change with time in the torque of the hydraulic pressure generator is low, and the change of the rate of change with time in the torque of the internal combustion engine is lower than the change of the rate of change with time in the torque of the hydraulic pressure generator when the rate of change with time in the torque of the hydraulic pressure generator is high.

5. The construction machine according to claim 1, wherein
the torque target is obtained based on a charge amount of the electric energy storage device.

6. A construction machine comprising:
an internal combustion engine;
an electric motor mechanically connected to the internal combustion engine; and
an electric energy storage device that supplies electric power to the electric motor;
the construction machine performing work by driving a hydraulic pressure generator using the internal combustion engine and the electric motor;
wherein the electric motor is speed-controlled by a speed command; and
torque of the internal combustion engine is greater than torque of the electric motor when a rate of change with time in torque of the hydraulic pressure generator is low; and the torque of the electric motor is greater than the torque of the internal combustion engine when the rate of change with time in the torque of the hydraulic pressure generator is high.

7. A construction machine comprising:
an internal combustion engine;
an electric motor mechanically connected to the internal combustion engine; and
an electric energy storage device that supplies electric power to the electric motor;
the construction machine performing work by driving a hydraulic pressure generator using the internal combustion engine and the electric motor;
wherein the electric motor is speed-controlled by the speed command; and
a change of a rate of change with time in torque of the internal combustion engine is higher than a change of a rate of change with time in torque of the hydraulic pressure generator when the rate of change with time in the torque of the hydraulic pressure generator is low; and the change of the rate of change with time in the torque of the internal combustion engine is lower than the change of the rate of change with time in the torque of the hydraulic pressure generator when the rate of change with time in the torque of the hydraulic pressure generator is high.

* * * * *